United States Patent

Mahlman

[15] 3,689,597

[45] Sept. 5, 1972

[54] POLYPHASE COMPOSITIONS AND PROCESS FOR THEIR PREPARATION

[72] Inventor: Bert H. Mahlman, West Chester, Pa.

[73] Assignee: Hercules Incorporated, Wilmington, Del.

[22] Filed: June 26, 1970

[21] Appl. No.: 50,300

Related U.S. Application Data

[63] Continuation-in-part of Ser. No. 670,412, Sept. 25, 1967, abandoned.

[52] U.S. Cl............260/897 R, 161/238, 260/33.6, 260/829, 260/45.85, 260/45.95
[51] Int. Cl...............................................C09j 3/26
[58] Field of Search ...260/27, 897 M, 897 A, 94.9 F, 260/94.9 G, 829, 33.6, 45.85, 45.95

[56] References Cited

UNITED STATES PATENTS

| | | | |
|---|---|---|---|
| 3,278,646 | 10/1966 | Lambert | 260/897 |
| 3,352,817 | 11/1967 | Meyer | 260/45.7 |
| 3,283,036 | 11/1966 | Larson | 260/897 |

*Primary Examiner*—Donald E. Czaja
*Assistant Examiner*—William E. Parker
*Attorney*—William S. Alexander

[57] ABSTRACT

Unique polyphase compositions are disclosed having, as a continuous phase a propylene polymer and as a second phase a substantially amorphous organic material selected from solid or semi-solid hydrocarbons and hydrocarbon resins. These compositions are prepared by dispersing a propylene polymer of substantially all sub-micron particle size in the second phase and fusing the polymer under controlled conditions which assure the formation of the propylene polymer into a continuous phase.

3 Claims, No Drawings

POLYPHASE COMPOSITIONS AND PROCESS FOR THEIR PREPARATION

This application is a continuation-in-part of my application U.S. Ser. No. 670,412, filed Sept. 25, 1967 and now abandoned.

The invention relates to unique polyphase compositions comprised of a crystallizable propylene polymer and an amorphous second phase. More particularly, it relates to a technique for preparing such polyphase compositions whereby a uniform distribution of the phases can be effected.

In many cases, it is desired to blend propylene polymers with major amounts of other materials to modify either the properties of the polymer or those of the other material. For example, it is known to add various types of rubber to polypropylene to improve its low temperature impact strength, terpene polymers or rosin derivatives to impact low temperature impact strength or heat sealability, or amorphous polypropylene to improve flow properties. Propylene polymers are also employed as additives to lubricants to stiffen the same and prevent splatter, and in some cases simply as a binder.

In applications such as those cited above and many others, the polymer is frequently present in the minor proportion and is intended to form a reinforcing phase supporting the other material. In actual practice, however, it is found extremely difficult, if at all possible, to incorporate the polymer uniformly enough that it can form a sufficiently disperse phase in the second material when the polymer concentration is less than 40 percent. This is due primarily to the very high melt viscosity of even low molecular weight propylene weight propylene polymers as well as to the high melt viscosity of the second phase in many cases. Blending of the phases is accomplished in the melt and such high viscosity materials cannot be readily blended even with the most efficient, high shear, melt-compounding equipment known. As a result, the compositions previously known to the art consisted, usually, of extremely non-homogeneous mixtures having substantial regions of the polymer phase randomly located throughout with, generally, no interconnection between them to form a truly continuous phase. The resulting composition, thus, does not possess the optimum strength or other property which the polymer is intended to impart thereto.

Polypropylene, and other polymers of propylene, as provided by the prior art, and which have been employed in preparing the prior art compositions which might be said to compare with those prepared by the instant invention have been provided in the form of relatively large particles, usually not less than about 30 microns. It has been possible to reduce the polymer to smaller particles only with great difficulty and such reduction has not resulted in particles less than about 10–15 microns in size. When polymer particles of this size are dispensed in the second phase such as asphalt, petroleum resins, terpene resins, or the like, the relatively large size of the polymer particles causes relatively large distances between particles in the liquid medium prior to their dissolving even though the particles are uniformly dispersed therein. Thus, when the particles dissolve, a substantial amount of flow of diffusion between phases is required if a homogeneous solution of the polymer in the other phase is to be realized. Unfortunately, the high viscosity of the two phases effectively prevents such diffusion unless extremely vigorous mixing conditions are employed. In most cases, the energy and temperature required are such as to result in degradation of the propylene polymer.

In accordance with this invention, an improved technique has been found for preparing homogeneous, polyphase structures containing a propylene polymer as a continuous phase. This technique is based on the discovery that the problems encountered in uniformly dispersing the polymer in the second phase can be substantially overcome by employing very finely divided polymer particles as the staring material. Stated more completely, the invention comprises a process for preparing solid, polyphase compositions containing (A) as a continuous phase, a crystallizable propylene polymer being present as a substantially continuous network in the crystalline but essentially non-spherulitic state, and having an intrinsic viscosity of at least about 2, and (B) as a second phase, a substantially amorphous organic material which has a theta temperature for the propylene polymer below about 160°C. and which can be maintained as a liquid at 110° to 250°C., is essentially a non-solvent for said crystalline propylene polymer at temperatures below about 80°C., has a cohesive energy density of from about 45 to about 100 calories per cubic centimeter at 20°C., which process comprises rendering the amorphous material fluid and uniformly dispersing therein a propylene polymer in the form of particles having an average size of 0.02 to 0.5 micron, heating the total composition to a temperature at which the propylene polymer dissolves in the amorphous material and cooling. The propylene polymer continuous phase constitutes 5 to 60 percent preferably 5 to 35 percent, by weight of the total composition.

By means of this invention, it is possible to form polyphase compositions having a propylene polymer continuous phase with substantially lower concentrations of propylene polymer than have previously been required. Using prior art techniques, based on the polymer flake available to prior art practitioners, it has not been possible to prepare compositions wherein the polymer is in a continuous phase at a concentration of the polymer of less than 40 percent. At polymer concentrations lower than 40 percent, the prior art compositions have not exhibited the characteristics of the polymer, indicating that the polymer was not present in a continuous phase. Above this 40 percent level, the prior compositions begin to exhibit brittleness, demonstrating the the propylene polymer phase is not continuous.

The propylene employed in the practice of this invention can have an intrinsic viscosity of from about 2 up to about 35, or even higher. The intrinsic viscosity (I.V.) which is an indication of the molecular weight or degree of polymerization of the polymer, is important in that it affects the concentration of the polymer, is important in that it affects the concentration of the polymer which is required to form the desired continuous phase. Lower concentrations of polymer are possible as the I.V. thereof increases. Useful compositions, exhibiting desirable properties, e.g., flexibility, ductility and tensile strength, can be prepared with as little as 5 percent of a polymer having an I.V. of 8 or higher.

However, when the polymer I.V. is less than 8, the concentration will normally be at least about 10 percent.

In connection with the intrinsic viscosity of the polymer, another advantage of this invention is realized. Normally, propylene polymers of the type herein employed are extremely sensitive to thermal and stress degradation, the problem being quite acute with high molecular weight i.e., high intrinsic viscosity) polymers since these require a large amount of energy for forming. As pointed out above, when large polymer particles are dispersed in the second phase, a large amount of diffusion between the phases is required in order to form a reasonably uniform solution from which a continuous phase can be prepared. This requires a relatively large amount of time and agitation or other type of working at the solution temperature, with resultant opportunity for degradation. The small particles of the present invention, having been uniformly dispersed, provide minimum inter-particle distances and short paths for diffusion of the second into the polymer particles so that little flow of diffusion between phases is necessary to form a solution and the mass need not be exposed to the elevated temperature for very long. The particles employed in the practice of this invention are so small that the requisite diffusion can be effected without the necessity for agitation, milling, or other work. Simply heating the mass to solution temperature for a few minutes is sufficient in most cases. Thus, substantially less degradation occurs and the viscosity of the polymer ultimately present will be higher than would be the case in a composition prepared from the same ingredients and blended to the same degree of uniformity using large particles.

Due to the limited amount of diffusion required to form uniform solutions and the resulting ability to prepare such solutions without the necessity for working the mass as by milling or the like, shaped structures of the compositions of this invention can readily be prepared by simply forming the dispersion into the desired shape, heating to effect solution of the polymer in the second phase and cooling to solidify the mass and form the desired continuous disperse phase. Since the propylene polymer particles are not dissolved at the time of the forming, they contribute very little to the viscosity of the composition. Accordingly, any technique normally used for forming the amorphous second phase can be employed, e.g., extrusion, injection molding slush molding, potting, compression molding, knife coating, roller coating, curtain coating, spraying, powder molding, organosol or plastisol fusion, and the like, depending on the melt viscosity of the second phase.

In addition, the small particles are readily suspended in liquid media, and when dispersed, remain dispersed in the liquefied second phase. Larger particles, such as the 10-micro and larger particles known to the prior art, settle out rapidly from suspension, which leads to difficulties in handling during the forming steps, as well as to non-uniformity of the product after fusion and cooling.

Yet another advantage of the present invention is the greater range in the thickness of the finished product resulting therefrom as compared to that prepared from prior art compositions. Using large particles of the propylene polymer to prepare, e.g., a coating film of one of these compositions, it would not be possible in most cases to form a useful coating in situ by fusion of a dispersion as contemplated herein due to the difficult diffusion between phases to form a uniform coating solution. When such a coating is formed it is necessarily a thick coating because of the relatively great size of the initial polymer flakes. In situ coatings are readily formed from the compositions of this invention and since the particles are very small, such coatings can be made extremely thin.

In order to incorporate the particulate propylene polymer into the amorphous phase, it is necessary to fluidify the amorphous phase, if it is not already fluid, and to disperse the polymer uniformly throughout the fluidified second phase while the polymer is still in solid, non-viscous form. This fluidification can be effected either by the use of heat or by dissolving the amorphous material in a suitable solvent. When the second phase has been fluidified, the particulate polymer is incorporated therein by an convenient means. For example, a paint mill, a roll mill or similar compounding apparatus can be employed or simple agitation in the case of low viscosity materials. Care must be exercised to assure that the physical state of the propylene polymer is not affected by the temperature of the system during this incorporation. Blending is continued for a long enough time to form a homogenous dispersion of the particulate polymer in the fluidified second phase. In the case where liquefaction is effected by means of a solvent, the blending can frequently be effected by less vigorous mixing techniques, e.g., simple propeller blade agitation.

The temperature at which the mixture of propylene polymer and the amorphous second phase material is heated to effect fusion into a continuous phase will depend on the specific polymer used, the nature of the second phase material, e.g., its theta temperature for the polymer, it solvating effect for the propylene polymer, its fluidity, etc., but must be a temperature sufficient to dissolve the polypropylene in the second phase material. In general, it will be a temperature within the range of about 120°C. to about 250°C., and preferably will be from about 120°C. to about 200°C.

The first phase of the polyphase compositions according to this invention comprises the crystallizable propylene polymer present as a substantially continuous network of the polymer, in either the monoclinic or the smectic state, and which is essentially non-spherulitic. It is well recognized that the division of polymer structure into crystalline and amorphous phases is an over-simplification, and more likely there exists a gradation in structural organization between these extremes. Yet in practice, the degree of crystallinity parameter is a useful concept in correlation of structure with physical properties. In the specific case of polypropylene structure, three unique levels of order are readily differentiated by standard X-ray diffraction methods. The amorphous state is characterized by a single broad diffraction maximum at $17.0°2\theta$ diffraction angle. The crystalline state is characterized by multiple well-defined maxima. Those of the $\alpha$ or monoclinic form occur at 14.0°, 16.8°, 18.5° and $21.8°2\theta\pi$. Those of the $\beta$ or hexagonal form occur at 15.0° and $21.3°2\theta$. The third state represents a condition of intermediate order called variously, the " paracrystalline" or "smectic" state which is characterized by two quite broad rather than sharp diffraction maxima at 15° and 21°2θ. This quasi-crystalline state, here called the smectic state, has short range order which differentiates it from the amorphous state but lacks the long range order associated with true crystals.

Polypropylene can exist in several polymorphic crystalline forms as is shown by their unique X-ray diffraction spectra discussed above. These forms are also readily observable under the polarizing microscope as spherical arrays of dendritic crystallites. Electron microscopy has recently revealed these dendrites to be regularly folded chain crystals having a fold period of a few hundred angstroms. The dendrites emanate from the nucleus, growing by noncrystallographic branching until their growth is constrained by impingement with dendrites from neighboring spherulites. These spherulitic structures fill the free volume. But since the observed (as opposed to the theoretical) degree of crystallinity as measured by density or X-ray is seldom more than 75 percent, appreciable uncrystallized polymer chains which are rejected during crystallization are segregated within and to a lesser extent between spherulites. The spherulite is, then, a two-phase structure with extensive folded-chain crystalline regions and amorphous regions as shown by heavy metal electron staining.

In contrast to the spherulitic crystalline state, the polypropylene which, in the polyphase compositions of this invention, is in the monoclinic or smectic state exhibits only a fine fibrous structure by electron microscopy. Unless the preponderance of the propylene polymer is in this fine fibrous non-spherulitic form, the polymer phase of the resultant compositions is not continuous and the properties exhibited by the compositions will be primarily those of the second phase. Reference herein to crystallization of the propylene polymer, when the polyphase compositions are formed, is to precipitation or crystallization of the propylene polymer to the monoclinic or smectic state.

In many instances, depending on the characteristics of the second phase material, storage conditions, and the like, the propylene polymer, if it is in the smectic form in the polyphase composition, may, on aging, slowly convert to the monoclinic crystalline form. The higher the temperature to which the polyphase composition is exposed, the more rapid is this conversion. In such cases the monoclinic polymer that is formed will be non-spherulitic and will still be in the extended form. Thus, the propylene polymer in the polyphase compositions of this invention will be seen to be present in an essentially wholly smectic state, or as a mixture of the smectic and monoclinic states, or as an essentially wholly monoclinic state.

The formation of the smectic or monoclinic state of the polypropylene is believed to be an effect of the degree of molecular mobility of the polymer during the period when crystallization is taking place. To prevent formation of the spherulitic crystalline form, molecular mobility must be restricted but not completely eliminated. The precise technique for controlling mobility depends upon the viscosity of the second phase while crystallinity is developing.

When the second phase material is a relatively low viscosity material such as a semi-solid hydrocarbon, e.g., petrolatum, it is preferable to cool the solution extremely rapidly. This rapid cooling, or quenching should be on the order of at least about 95°C./minute. Thus, the propylene polymer is crystallized rapidly enough to prevent spherulitic crystal formation resulting in formation of a continuous propylene polymer phase and, the polymer phase substantially encloses the second phase.

When the second phase is of intermediate viscosity as e.g., asphalt, terpene resins, or similar materials, quenching is not required, in most cases, although it is not necessarily detrimental. In these cases, it appears that the viscosity of the second phase is great enough that it can exert the necessary restraining influence or molecular mobility of the propylene polymer phase. Apparently only sufficient movement is allowed that the polymer can form only the desired non-spherulitic crystalline state within the time available during cooling. There is usually not time for development of a complete three-dimensional spherulitic structure prior to complete solidification of the polypropylene. In some cases, it is even desirable to anneal the composition following cooling or solidification in order to promote crystallization even to the smectic crystalline state.

In a third class are the materials of extremely high viscosity. In this case, the viscosity is sufficiently high to immobilize the polypropylene completely, thereby preventing any crystallinity in the same upon cooling. When this is the case, a viscosity reducer must be present during the crystallization period. This can be accomplished, e.g., by having a solvent or plasticizer present during the crystallization period. Since most materials of this third category are not readily made fluid by heat alone and must be dissolved in a solvent in order to fluidize them, it is a simple matter to assure that this solvent remains until after the propylene polymer has solidified.

The second phase is a material or combination of materials which is essentially amorphous at 20°C. and which can be fluidified and maintained as a liquid within the temperature range between 110° and 250°C. This fluidification can be either by heating, dissolution, or both. Within the above temperature range, the fluid material must exhibit a specified degree of solubility or compatibility for the propylene polymer. The amorphous second phase material is most accurately described as having a critical miscibility temperature (theta temperature) for the propylene polymer below about 160°C. and must also be fluid at the theta temperature. On the other hand, to produce solid polyphase compositions, the second phase substance must be a non-solvent for the propylene polymer at use temperatures, normally 80°C. and less. In order for the second phase material to be sufficiently compatible to prepare the polyphase compositions of this invention, it must have a cohesive energy density (CED) between about 45 and 100.

The second phase materials are those substances having a CED within the range specified above and which are substantially non-polar in nature. Examples of such materials are the amorphous solid and semi-solid petroleum hydrocarbons, asphalt, hydrocarbon resins such as the polyterpene resins, coal and petroleum resins, amorphous polypropylene, and styrene resins.

All of the above are substantially amorphous materials which can be benefitted in one or more ways be addition thereto of a continuous propylene polymer network. Benefits which can be effected include a stiffening action or increased modulus resulting from the polymer network, a reduction in surface tackiness or blocking tendency, reduction of cold flow and creep characteristics, and increased strength and elongation. In some cases, the propylene polymer network imparts orientability to the compositions. Of course, not all of the possible compositions resulting from the invention are benefitted in the same way or to the same extent.

All of the compositions do, however, contain the propylene polymers as a continuous phase which can be clearly seen if the amorphous material is extracted with a solvent which dissolves the amorphous phase without dissolving the propylene polymer. After the extraction, the propylene polymer remaining is in the form of a tough, coherent, elongatable sheet or film. By contrast, after extraction of the amorphous phase from compositions prepared with large particle propylene polymers, the remaining polymer is a weak structure having virtually no strength and which is easily reduced to a powder.

The polyterpene resins are a well-known class of resinous materials obtained by the polymerization or copolymerization of terpene hydrocarbons such as the alicyclic, monocyclic and bicyclic terpenes and their mixtures, including alloocimene, carene, isomerized pinene, pinene, dipentene, terpinene, terpinolene, turpentine, a terpene cut or fraction, and various other terpenes. Typical of such terpene resins are those sold under the trademark "Piccolyte," which are beta-pinene polymers and which can be had in a wide range of softening points of from 10°C. to 135°C. They generally have densities of from 0.97 to 1.0 and range in molecular weight up to about 1,200.

Also important are the hydrogenated polyterpenes, which resins are produced by hydrogenating the polyterpenes by any of the usual hydrogenation processes. Generally the hydrogenation is carried out utilizing a catalyst such as nickel, nickel on kieselguhr, copper chromite, palladium-on-carbon, platinum on alumina, or cobalt plus zirconia or kieselguhr. The hydrogenation is preferably carried out in the presence of a solvent such as methyl cyclohexane, toluene, p-methane, etc., utilizing pressures ranging from 500 to 10,000 p.s.i. and a temperature of 150° to 300°C.

The petroleum resins are those obtained by the catalytic polymerization of a mixture of monomers derived from deep cracking petroleum which monomers are chiefly mono- and diolefins. The polymerization of such mixtures is generally carried out at low temperatures using Friedel-Crafts catalysts. These resins have softening temperatures (Ball and Ring) ranging from 50° to 150°C., a specific gravity 25/25°C. of 0.96–0.980, an iodine value (Wijs) of 80–150, and a molecular weight of 500 to 2,000. Typical of these resins are those sold by Pennsylvania Industrial Chemical Corporation under the trade name of "Piccopale." The petroleum resins, like the terpene resins, can be hydrogenated to reduce their unsaturation, lighten their color and otherwise improve their properties.

Another type of hydrocarbon resin useful in the present invention are the polymers of unsaturated coal tar by-products such as the polyindene and coumarone-indene resins. Typical of these resins are the "Piccocoumorones" sold by Pennsylvania Industrial Chemical Corporation, which have softening points of 38 to 120°C. and specific gravity of 1.05 to 1.10 and the "Cumars" sold by Allied Chemical and Dye Corporation, with softening points of about 70° to 130°C. with specific gravity of 1.09 to 1.14.

Also useful are the hydrocarbon resins known as styrene resins, as for example, polystyrene, styrene—olefin and styrene—diolefin copolymers, poly($\alpha$-methylstyrene), styrene—vinyl toluene copolymer, $\alpha$-methylstyrene—vinyl toluene copolymer, etc. These resins will generally have a softening point (Ball and Ring) of from about 50°C. to about 150°C. Typical of such resins are Piccolastic D-150 and Piccotex 120, sold by Pennsylvania Industrial Chemical Corporation.

Amorphous solid and semi-solid petroleum hydrocarbons are exemplified by the petroleum jellies such as petrolatum and by asphalt which is a native mixture of hydrocarbons occurring as an amorphous solid or semi-solid black pitch or bitumen. It includes asphaltenes, carbenes, and asphaltic resins.

Amorphous polypropylene which can be used as the second phase is frequently referred to as "atactic" polypropylene due to its lack of stereoregularity of the methyl groups along the polymer chain. It usually has an intrinsic viscosity on the order of 0.2 to 0.7 and is rubbery and tacky in appearance. There is frequently a very small fraction of this material present with the small particle isotactic polymer. In such cases, the amorphous polymer enters into and becomes part of the second phase.

The unique propylene polymers employed in the preparation of the compositions of this invention are in the form of tiny particles which have an average particle size between about 0.02 and 0.5 micron in size, with at least 75 percent of the particles being about 0.1 to 0.4 micron in size with substantially no irreversible clusters of particles greater than about 5 microns.

The efficacy of the polymer for use in the invention does not depend upon any particular method of preparing the same, so long as its particle size is within the prescribed range. Although the preparation of the very tiny particles to be employed forms no part of this invention, the following description is presented to illustrate one very useful method of preparing propylene polymer particles within the useful range.

Such small particles of polypropylene are prepared by polymerizing propylene in the presence of a colloidal dispersion of a trivalent titanium-containing catalyst. It is well known that an $\alpha$-olefin such as propylene can be polymerized with the aid of catalysts containing organometallic compounds in combination with transition metal compounds. Particularly effective catalysts for this purpose are combinations of alkylaluminum compounds and titanium compounds. When preparing the tiny particles of crystalline polypropylene, it is necessary first to prepare a colloidal trivalent titanium-containing catalyst and then use this catalyst in combination with an aluminum alkyl compound to polymerize the propylene, thereby obtaining a colloidal dispersion of the polymers. Any titanium trichloride can be used for the preparation of the colloidal catalyst provided that it contains, if any, only a minor amount of the beta form of the titanium trichloride. A particularly active titanium trichloride-containing catalyst is obtained by reducing titanium tetrachloride at low temperature with an aluminum alkyl such as an alkylaluminum sesquichloride and then heat treating the precipitate so obtained. A colloidal dispersion of the trivalent titanium catalyst is then prepared by suspending it in any convenient inert hydrocarbon diluent, as for example, n-heptane, kerosene, etc. To this suspension is then added a dialkyaluminum halide such as diethylaluminum chloride or diisobutylaluminum chloride, in a ratio of from about 0.1 to about 4.0 aluminum per titanium. Other catalyst components can be used in conjunction with the titanium and aluminum components such as Lewis bases, as for example, anisole. There is then added from 3 to 40 moles per mole of titanium of a straight chain α-olefin containing at least 6 carbon atoms. Exemplary of the α-olefins that may be used for this purpose are: n-hexene-1, n-octene-1, decene-1, undecene-1, dodecene-1, and hexadecene-1. The polymerization of this long chain α-olefin is generally carried out at moderate temperatures, as for example, from about 30°C. to about 70°C. There is obtained by this process a colloidal suspension of the trivalent titanium-containing catalyst. This colloidal suspension can be used at once or stored until desired.

The propylene polymerization process is carried out by adding to a suitable liquid organic diluent, as for example, a saturated aliphatic, cycloaliphatic, or aromatic hydrocarbon, an aluminum alkyl activator such as diethylaluminum chloride or ethylaluminum chloride alkoxide, in an amount of from about 5 to 10 millimoles per liter of diluent. Exemplary of the diluents that can be used are: hexane, heptane, octane, decane, cyclohexane, benzene, toluene, xylene, and mixtures of such hydrocarbons, as for example, high and low boiling kerosene and other such petroleum fractions, chlorinated aromatic hydrocarbons, highly hindered aliphatic ethers, sulfides, etc., such as di-t-butyl ether, aromatic ethers such as diphenyl ether and other inert liquid organic diluents and liquid propylene itself. The colloidal dispersion of trivalent titanium catalyst is then added and the propylene is introduced at a very slow rate so as to increase the pressure gradually to 75 p.s.i.g. or higher, which pressure is maintained until the polymerization is complete. Hydrogen can be added if desired to produce a lower molecular weight polymer. The polymerization is generally carried out at a temperature of from about 30°C. to about 80°C. The length of time the polymerization is carried out will be dependent upon the solids content desired or until the viscosity of the reaction mixture becomes too great for easy agitation. The polymerization is stopped by adding a small amount, as for example 2 volume percent based on the original volume of diluent, of an alcohol such as n-butanol. The catalyst residues are removed by any of the usual means utilized in the purification of polyolefins, such as for example, an acid, water or basic wash, treatment with an ion exchange resin or any other convenient means.

The crystallizable propylene polymers which can be employed as the continuous phase of the compositions of this invention include propylene homopolymer and copolymers of propylene with up to about 25 percent of a second α-olefin having two to 20 carbon atoms. Exemplary copolymers are those of propylene with ethylene, butene-1, pentene-1, 3-methylbutene-1, 4-methyl-pentene-1, hexene-1, octene-1, decene-1, dodecene-1, tetradecene-1, hexadecene-1, octadecene-1, eicosene-1, styrene and substituted styrenes such as halo- and alkyl-substituted styrenes, for example, p-chloro- and p-methylstyrene.

Preferably, the copolymer is of the type prepared by simultaneous polymerization of the olefins so that the minor olefin is randomly distributed throughout the copolymer molecule. In this type copolymer, about 8 weight percent of a minor olefin is the upper limit. This will vary with different olefins, being less with the higher olefins than with, e.g., ethylene or butene-1.

In some cases, the copolymer can be an end-block type copolymer. This type copolymer is prepared by first polymerizing a portion of propylene alone, followed by a portion of the minor olefin and thereafter, if desired, alternating the two olefins. This type copolymer is characterized by remaining crystallizable at higher concentrations of the minor olefin than does the random type. Thus, employing the end-block technique, crystallizable copolymers with, e.g., ethylene as the minor olefin, can be prepared having up to 25 weight percent of the minor olefin. When the minor olefin is a long chain olefin, as, e.g., tetradecene-1, this upper limit will be less, usually not more than about 10 to 12 weight percent.

When it is desired to produce a copolymer of propylene with a second gaseous olefin, the same procedure as described for preparing polypropylene is followed except that the monomer gas is a mixture of propylene and the second olefin or olefins in the ratio required to yield the correct ratio in the final products. This ratio depends upon the relative polymerization ratio of the olefins and is readily calculated by those skilled in the polyolefin art.

If the second olefin is a liquid, the total amount of such olefin to be used can be dissolved in the reaction diluent prior to the addition of any propylene gas or it can be used as the diluent. Alternatively, the second olefin can be added continuously throughout the reaction time period as is done with gaseous olefins. In either case, the ratio of the monomer depends upon the desired final ratio and on the polymerization reactivity of the second olefin relative to propylene.

The polypropylene, as it is prepared, is in the form of a colloidal dispersion of the particles in the hydrocarbon reaction diluent. Such dispersions usually are on the order of about 20 to 30 percent solids, i.e., polymer content, although this can be varied either by polymerization conditions or by dilution or concentration after completion of polymerization.

The polymer can be used in the process of the invention in the colloidally dispersed form recovered from the polymerization, or it can be separated from the dispersion and used in the form of dry solid particles. In the former case, provision must be made for removal of the solvent at a later time, at some point in the process after the polymer has been dispersed in the amorphous material. If dry polymer is to be used, the polymer is readily separated from the diluent by such methods as spray drying, vacuum stripping, drum drying, or by centrifuging, followed by evaporation of residual diluent.

This must, of course, be effected at a low enough temperature that no significant amount of softening of the particles can take place. Preferably, diluent removal is carried out at less than about 60°C.

Any of the usual additives can also be incorporated in these polyphase compositions, as for example, pigments and pigment dispersants, dyestuffs, heat and light stabilizers and antioxidants, plasticizers, fillers, and the like.

The invention is illustrated by the following illustrative examples.

EXAMPLE 1

To a nitrogen filled reaction vessel, equipped with a magnetic stirring bar, was added 496 millimoles of isobutyl-aluminum sesquichloride as a 1.12 M solution in a refined kerosene (boiling range of 165°-200°C.). With the temperature adjusted to 2°-3°C., there was added to the stirred solution, in one addition, 240 millimoles of titanium tetrachloride. The mixture was stirred for 4 hours at 2°-3°C., then with stirring, was allowed to warm to room temperature during 16 hours, after which it was heated to 150°C. during 2 hours, held at that temperature for 1 hour and then allowed to cool. The reaction slurry was transferred under nitrogen to a centrifuge, the supernatant was discarded and the titanium trichloride-containing precipitate was washed under nitrogen three times with n-heptane by agitation and centrifugation each time. It was then brought back to its original volume with n-heptane. Analysis showed it to be 0.575 M in titanium.

A nitrogen filled reaction vessel was charged with 1.4 l. of n-heptane, 16.8 millimoles of diethylaluminum chloride and an amount of the above prepared titanium trichloride containing catalyst equal to 35 millimoles of titanium. With the temperature adjusted to 50°-52°C., there was then added 525 millimoles of octene-1 and the mixture was held at 50°-52°C. for one hour.

To a reaction vessel, held at about 50°C., and containing 15.4 l. of n-heptane under nitrogen was added 160 millimoles of the reaction product of diethylaluminum chloride with a molar equivalent of 2-ethylhexanol. The above prepared colloidal dispersion of titanium trichloride catalyst was added and propylene was then slowly admitted to a pressure of about 45-50 p.s.i.g., which pressure was maintained for 5 hours. The reaction was stopped by adding 340 ml. of n-butanol and the reaction mixture was stirred for 16 hours at 50°C. The reaction mixture was stirred under nitrogen with 4 percent aqueous hydrogen chloride for 3 hours at room temperature and then washed three times with water. The colloidal polypropylene dispersion so obtained had a solids content of 21 percent, of which 9.9 percent was soluble in decahydronaphthalene and had an intrinsic viscosity of 11.9. The average primary particle size of the polypropylene was 0.2-0.3 micron; many of the particles were present as reversible clusters of 1 to 5 microns in size.

EXAMPLE 2

A nitrogen filled reaction vessel, equipped with an agitator and cooled to 0°C. by ice water, was charged with one mole of titanium tetrachloride added as a 25 percent solution in a purified petroleum fraction (having a boiling range of 165°-200°C.). Over a period of 4 hours, there was then added 1.3 moles of ethylaluminum sesquichloride as a 25 percent solution in the purified petroleum fraction. The reaction mixture was agitated an additional 2 hours at 0°C. and then was allowed to warm to room temperature, after which it was heated to 80°-85°C. for 3 hours to complete the reduction of tetravalent titanium to trivalent titanium. The titanium trichloride-containing precipitate was separated and washed with portions of kerosene, after which it was held at 100°C. for 24 hours to complete the activation of the catalyst.

A nitrogen filled reaction vessel was charged with 17.2 l. of n-heptane, 172 millimoles of diethylaluminum chloride, and an amount of the above prepared titanium trichloride-containing catalyst equal to 60 millimoles of titanium. With the temperature adjusted to 50°C., there was then added 0.9 mole of octene-1. After 1.25 hours at 50°C., propylene was slowly added to a pressure of about 45-50 p.s.i.g., which pressure was maintained throughout the reaction. About 1 hour after the start of the propylene addition, hydrogen was admitted and maintained at about 5 mole percent in the gas phase. The reaction was stopped after 4.25 hours by adding 350 ml. of n-butanol. The polypropylene dispersion so obtained was purified as described in Example 1. It had a solids content of 18.7 percent, of which 7.1 percent was decahydronaphthalene soluble, and an intrinsic viscosity of 3.1. The average primary particle size was 0.2-0.3 micron and many particles were present as reversible clusters of 0.5 to 5 microns in size.

EXAMPLE 3

The colloidal dispersion of polypropylene used in this example was that prepared in Example 1, to which was added 0.5 percent of a phenolic antioxidant and 0.25 percent of lauryl thiodipropionate, based on the polypropylene. The polypropylene was dispersed in the resin by blending the heptane dispersion of the colloidal polypropylene with a 60 percent solution of the resin in heptane, adding a hydrocarbon oil having a boiling point range of 242°-266°C., and then stripping off the heptane at 75°C. under reduced pressure. A stable dispersion of the particles in the resin solution resulted in each case. The resin used was hydrogenated polyterpene.

Smooth, glossy coatings of each of the polypropylene—resin blends were obtained by drawing down on paper with Meyer rods, dissolving the polypropylene particles by placing the paper on a curved metal plate heated to 149°C. for 1.5 minutes, and cooling to room temperature. Each was then tested for its resistance to blocking by placing sections of the coated paper face-to-face with itself in an 80°C. oven for 4 hours under a pressure of 2 lbs./sq. in. and compared with paper coated with the resin containing no polypropylene. The results are tabulated below:

| | Coating Formulation % Polypropylene | % Resin | % of Area Under Pressure That Blocked |
|---|---|---|---|
| Example 3 | | | |
| a | 50 | 50 | 0 |
| b | 25 | 75 | 1 |
| Control | — | 100 | 30 |

In each case, the coatings containing the polypropylene separated with no damage to the coatings.

EXAMPLES 4-8

Polypropylene—resin dispersions were prepared by blending the heptane dispersion of polypropylene prepared in Example 1, which was stabilized by the addition of 0.5% of a phenolic antioxidant and 0.25 percent of lauryl thiodipropionate, based on the polypropylene; with 60 percent solutions of the following resins in an alkylated aromatic petroleum fraction (boiling range of 185°-213°C.) at a ratio of 25 parts polypropylene per 75 parts resin:

| | |
|---|---|
| Example 4 | coumarone-indene resin — softening point of 99-107°C. (ball and ring) and an Iodine No. of 43 (Cumar MN 2½ sold by Allied Chemical & Dye Corporation) |
| Example 5 | a thermoplastic petroleum resin — softening point of 110°C. (ball and ring), molecular weight about 1500 and Bromine No. of 37 (Piccopale 110 sold by Pennsylvania Industrial Chemical Corporation) |
| Example 6 | polyindene — softening point of 120°C. (ball and ring) and Bromine & Iodine No. of 12 (Piccoumaron 410 EHL by Pennsylvania Industrial Chemical Corporation) |
| Example 7 | polystyrene — softening temperature of 150°C. (ball and ring), molecular weight of 5000 (Piccolastic D150 by Pennsylvania Industrial Chemical Corporation) |
| Example 8 | α-methylstyrene—vinyltoluene copolymer — softening temperature of 120°C. (ball and ring), sp. gr. 1.04 and refractive index 1.58 (Piccotex 120 by Pennsylvania Industrial Chemical Corporation) |

These dispersions of colloidal polypropylene in the resin solutions were concentrated to 40-55 percent total solids by stripping under reduced pressure at 75°C. Films of each were then drawn on glass and baked 10 minutes at 204°C. These films were then compared with films prepared in the same way from the resins having no polypropylene added. The films prepared from the compositions of Examples 4-6 were in each case tough films that maintained their integrity when scratched, whereas the control films in each case were weak, brittle films that flaked readily when scratched with the fingernail. While the films prepared from the styrene resins used in Examples 7 and 8 were tough and maintained their integrity when scratched, the films prepared from the compositions of Examples 7 and 8 containing 25 percent polypropylene had greatly improved mar resistance.

EXAMPLE 9

This example demonstrates the preparation of dry blends of resin and submicron polypropylene which can be admixed with a diluent to yield a dispersion of colloidal polypropylene in a solution of the resin.

The colloidal polypropylene dispersion used was prepared in n-heptane following the general procedure described in Example 1. The dispersion had a total solids content of 20.2 percent and the polypropylene had an intrinsic viscosity of 10.3 and contained 16.5 percent of decahydronaphthalene-soluble polymer. Before using, there was added to the dispersion 0.5 percent of a phenolic antioxidant and 0.25 percent of lauryl thiodipropionate, based on the polypropylene.

A blend of 50 percent colloidal polypropylene and 50 percent hydrogenated polyterpene resin was prepared by mixing 100 parts of a heptane solution of the resin (50 percent total solids) with 248 parts of the heptane dispersion of colloidal polypropylene. The mixture was sprayed onto an aluminum sheet and any residual solvent was driven off by heating at 75°C. in a circulating air oven. When flaked off the aluminum sheet, coarse-to-fine powders were obtained. Microscopic examination of these powders indicated that the polypropylene particles were surrounded by the resin. The dry powder (12 parts) was blended with 18 parts of deodorized kerosene (boiling range 196°-254°C.) and after allowing sufficient time for the resin to dissolve, the mixture was put through a hand homogenizer. A smooth, uniform dispersion of polypropylene in the resin solution was obtained, the polypropylene having the same particle size as the original colloidal polypropylene dispersion.

EXAMPLE 10

The colloidal polypropylene dispersion used in this example was prepared by the general procedure described in Example 1. The dispersion had a total solids content of 20 percent and the polypropylene had an intrinsic viscosity of 12.1 and contained 8.5 percent decahydronaphthalene-soluble polymer. Before using, there was added to the dispersion 0.5% of a phenolic antioxidant and 0.25 percent of lauryl thiodipropionate, based on the polypropylene.

Dry blends of colloidal polypropylene and hydrogenated polyterpene were prepared as described in Example 9. Smooth pastes were prepared by warming (75°C.) 100 parts of the dry blend with 67 parts of deodorized kerosene, blending the mixture on a three-roll mill with 25 parts of a red pigment and then adding during the blending additional deodorized kerosene to produce pastes of about 56% total solids.

These pigmented resin pastes were drawn down on paper with Meyer rods and cured by placing the paper on a curved metal plate heated to 149°C. Each of the coated papers was then checked for resistance to smearing by rubbing with the finger, with the following results:

| | Composition of Paste Solids | | | |
|---|---|---|---|---|
| | Parts Polypropylene | Parts Resin | Parts Pigment | Resistance to Smear |
| Example 10a | 50 | 50 | 25 | Good to excellent |
| b | 25 | 75 | 25 | Good to excellent |
| Control | — | 100 | 25 | Fair |

EXAMPLES 11 to 12

The colloidal polypropylene dispersion used in Example 11 was that prepared in Example 1 and that used in Example 12 was that prepared in Example 2. To each was added 0.5 percent of a phenolic antioxidant and 0.25 percent of lauryl thiodipropionate, based on the polypropylene.

These examples illustrate the improvement in the strength of hard resins by the addition of colloidal polypropylene.

Dry blends of colloidal polypropylene and hydrogenated polyterpene were prepared as described in Example 9. The dry blends were then molded into 2- to 10-mil films by compression molding at 204°C. between smooth platens and then cooled under pressure. It was not possible to prepare films from pure resin, the thin, brittle films crumbling to powdery flakes in each case when removed from the platens. Tabulated below are the tensile properties obtained on 0.5 inch strips of each film pulled at cross-head speeds of 1 inch per minute.

| Film Composition | | Tensile Strength p.s.i. | % Elong. | Modulus p.s.i. |
|---|---|---|---|---|
| | Polypropylene | Resin | | |
| Control[1] | 100 | — | 5270 | 622 | 111,000 |
| Ex. 11a | 50 | 50 | 3000 | 38 | 208,000 |
| b | 25 | 75 | 1740 | 4 | 278,000 |
| Control[2] | 100 | — | 4180 | 140 | 143,000 |
| Ex. 12a | 50 | 50 | 2040 | 1 | 273,000 |
| b | 25 | 75 | 343 | <1 | 259,000 |

(1) Polypropylene of intrinsic viscosity 11.9.
(2) Polypropylene of intrinsic viscosity 3.1.

EXAMPLE 13

This example demonstrates the use of colloidal polypropylene—resin blends as adhesives for heat sealing.

Blends of 25 parts colloidal polypropylene and 75 parts of specified resins were prepared and coated on paper as described in Example 3. Sheets of the coated paper were placed face-to-face and bonded together by a heat sealer at 160°C. under 20 p.s.i. for 15 seconds. The following results were obtained:

| Resin | Adhesion of Coated Paper | |
|---|---|---|
| | 100% Resin Coating | 75:25 Resin: Polypropylene Coating |
| Hydrogenated polyterpene | nil | Paper tears |
| Coumarone-Indene | nil | Paper tears |
| Petroleum resin | nil | Paper tears |

EXAMPLE 14

A 35% by weight solution of low molecular weight amorphous polypropylene (I.V. 0.4) in a hydrocarbon fraction boiling at 188°–210°C. was prepared. A dispersion of crystallizable polypropylene in this solution was prepared using 0.3 micron particles having an intrinsic viscosity of about 9. The polymer was added in the form of an 18 percent dispersion in a hydrocarbon fraction boiling at 160° to 200°C. and containing the stabilizer system specified in Examples 4–8. Dispersions were prepared having 50 and 75 percent amorphous polypropylene.

Films were cast with each dispersion using a 15-mil casting knife on chrome-plated brass panels. These panels were baked for 10 minutes at 190°C., air cooled and stripped for physical testing. Properties were as follows:

| Amorphous Content | 75% | 50% |
|---|---|---|
| Film thickness, mils | 2.2 | 1.6 |
| Tensile strength, p.s.i.[1] | 406 | 990 |
| Tensile modulus, p.s.i. | 3300 | 10,900 |
| Elongation at break, % | 300 | 240 |

(1) ASTM D882, rate of elongation 100%/min.

By contrast, a film of unmodified amorphous polypropylene has substantially no film strength.

EXAMPLE 15

A 35% by weight solution of amorphous polypropylene (I.V. 0.4) in an aromatic hydrocarbon fraction boiling at 188°–210°C. was prepared. This solution was treated as follows:

A. By propellor blade stirring, 78 parts of a 15 percent dispersion in heptane of 0.3-micron polypropylene having an I.V. of 7.4 was added to 100 parts of the solution. The amorphous to crystalline polypropylene ratio was 3:1.

B. A similar dispersion was prepared using 192 parts of the 0.3-micron polypropylene dispersion. The amorphous to crystalline ratio was 1.2:1.

C. A dispersion of 11.7 parts of 10-micron polypropylene having an I.V. of 7 in 65.3 parts of heptane was added to 100 parts of the solution. Amorphous to crystalline ratio was 3:1.

D. A dispersion of 28.8 parts of 10-micron polypropylene in 164 parts of heptane was added to 100 parts of the solution. Amorphous to crystalline ratio was 1.2:1.

E. A dispersion of 11.7 parts of standard commercial polypropylene flake of 35 microns and up and having an I.V. of 5.7 in 113 parts heptane was added to 100 parts of the solution. Amorphous to crystalline ratio was 3:1.

F. A dispersion of 28.8 parts of the commercial polypropylene flake in 164 parts heptane was added to 100 parts of the solution. Amorphous to crystalline ratio was 1.2:1.

In all of the above compositions the polymer was stabilized by addition of, based on polymer weight, 0.25 percent distearyl thiodipropionate and 0.5 percent of the reaction product of one mole of 4,4'-n-butylidene-bis(2-t-butyl-5-methylphenol) and 2.5 moles of diphenyl isooctyl phosphite.

Dispersions B and D were shaken with glass beads for 15 minutes, then filtered through a coarse cloth filter. These were designated B' and D' respectively.

Films were cast on chrome-plated brass panels with a 30-mil casting knife, air dried 10 minutes and baked for 15 minutes at 177°C. in a circulating air oven. The fused films were quenched in cold tap water. The films prepared using the 10-micron polypropylene were flat textured and rough to the touch. Those from the 0.3 micron material were smooth and glossy. Those prepared with the large particle flake were extremely rough and the irregularities in thickness due to the large particles were clearly discernible to the naked eye.

The films prepared from B, D, B' and D' were stripped from the panels and tested for physical properties, the results of which clearly show the improvement caused by use of the 0.3-micron polymer.

| Dispersion Used | B | D | B' | D' |
|---|---|---|---|---|
| Tensile strength, p.s.i.[1] | 1260 | 940 | 620 | 460 |
| Elongation, %[2] | 580 | 50–65[3] | 310 | 36 |
| Modulus, p.s.i. | 5200 | 9000 | 5100 | 10,000 |

(1) Tensile properties determined 25°C., 100%/minute cross-head speed
(2) Elongation at break
(3) Erratic results varied in indicated range.

EXAMPLE 16

A blend was prepared by dispersing 20 parts of polypropylene in the form of dried particles of about 0.3 micron in 100 parts of molten petrolatum (Esso 8059) at about 70°C.

The above composition was compression molded into plaques one-fourth inch thick at 177°C. and allowed to cool to room temperature in the air. The plaques were very tough, flexible and dry to the touch. Similarly, a film of the dispersion was cast on a metal panel, fused at 177°C. and quenched in cold tap water (i.e., a cooling rate of greater than 200°C./minute). The film was readily stripped from the panel, was dry, tough and flexible and could be drawn by hand about 500 percent.

EXAMPLE 17

A mixture of flat asphalt and fine particle polypropylene having an average particle size of 0.3 micron and intrinsic viscosity of 2.77 was prepared by charging 93 parts of the asphalt and 7 parts of the dried polymer particles to a blendor with sufficient dry ice to freeze and embrittle the asphalt. The mixture was agitated in the blendor until the asphalt was reduced to small particles and intimately blended with the polymer particles. The blend was fed to an extruder and extruded at 175°C. to form a ribbon 15-mil in thickness. By contrast, asphalt without the polypropylene present therein could not be extruded.

The above was repeated twice more using 90 parts asphalt with 10 parts polymer and 86 parts asphalt with 14 parts polypropylene. These were likewise extruded into ribbons and the properties of the three compositions were compared with those of asphalt unmodified with polypropylene. Comparison was as follows:

| % Polymer | Surface Feel | Cold Flow at 25°C. | Softening Point °C.[1] | Penetration mm.[2] |
|---|---|---|---|---|
| 0 | Tacky | yes | 82 | 2.6 |
| 7 | Tacky | yes | 155 | 1.8 |
| 10 | Dry | no | 151 | 1.1 |
| 14 | Dry | no | 157 | 0.7 |

(1) Ball and ring softening point
(2) Penetrometer with 50 gram weight

The improvement in softening point and hardness of the asphalt compositions containing the polymer is surprising and unexpected. In fact, the softening point is very close to that of the polypropylene itself. This would not have been expected in view of the relatively small amount of the polymer which is present.

What I claim and desire to protect by Letters Patent is:

1. As a new composition of matter a solid polyphase composition containing
   A. as a continuous phase about 5 to 35 percent by weight of a crystallizable propylene polymer being present as a substantially continuous network in the crystalline but essentially non-spherulitic state and having an intrinsic viscosity of at least about 2, and
   B. as a second phase about 95 to 65 percent by weight of an amorphous hydrocarbon resin, said resin having a critical miscibility temperature for the propylene polymer below about 160°C. and a cohesive energy density of about 45–100 calories per cubic centimeter at 20°C. and being selected from a class consisting of polyterpene resins, amorphous polypropylene, polyindene, coumarone-indene resins, petroleum resins, and styrene resins.

2. The composition of claim 1 wherein the hydrocarbon resin is a petroleum resin.

3. The composition of claim 2 where the hydrocarbon resin is a polyterpene.

* * * * *